July 11, 1961 J. C. WILSON 2,991,922
TWO-COMPARTMENT RECEPTACLE
Filed Dec. 9, 1957 2 Sheets-Sheet 1
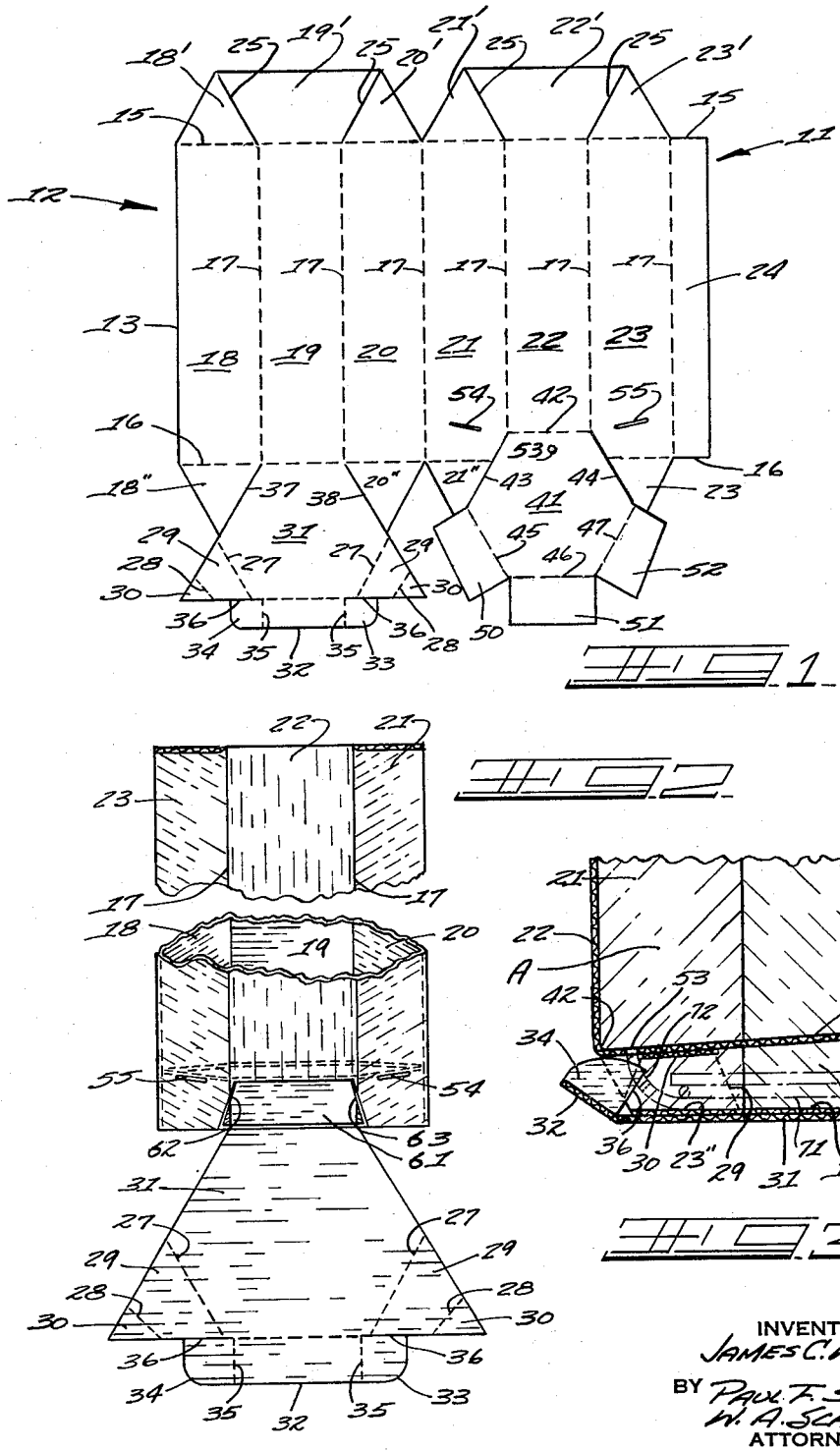
INVENTOR
JAMES C. WILSON
BY PAUL F. STUTZ
W. A. SCHAICH
ATTORNEYS

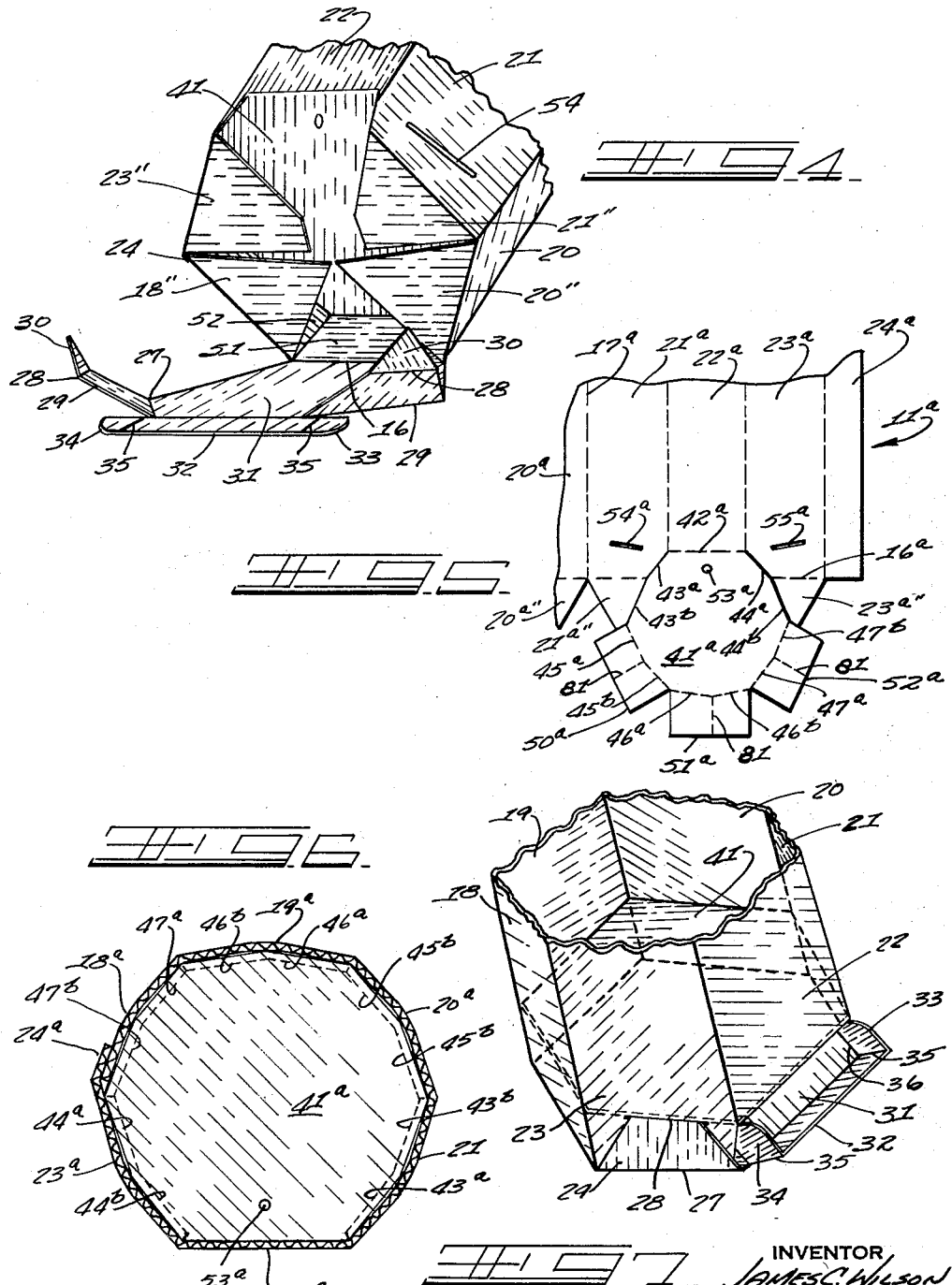

United States Patent Office 2,991,922
Patented July 11, 1961

2,991,922
TWO-COMPARTMENT RECEPTACLE
James C. Wilson, Jacksonville, Fla., assignor, by mesne assignments, to Owens-Illinois Glass Company, Toledo, Ohio, a corporation of Ohio
Filed Dec. 9, 1957, Ser. No. 701,515
4 Claims. (Cl. 229—27)

The present invention relates to a receptacle construction. More particularly, the present invention relates to a receptacle or container construction having two compartments, and which receptacle is formed of relatively stiff, sheet-like material, e.g., corrugated board.

The design of the novel receptacle construction of the present invention was conceived in order to overcome certain difficulties and disadvantages attending the handling of bulk liquid, e.g., milk as practiced in certain localities.

It has recently become the practice in certain localities to dispense milk at the consumer level, e.g., in restaurants, cafeterias, drive-ins, and the like, by the glass. This avoids the expense attending the utilization of individual sealed portions in bottles or waxed cardboard containers. For this purpose, the milk is put up in bulk in stainless steel drums which have been modified by incorporating at the bottom thereof a two-inch nipple over which is fitted one end of a hollow, flexible piece of rubber tubing, sealed at the other end for reasons of sanitation. The foregoing is furnished to the restaurant owner, who positions the five-gallon stainless steel drum in a cooler arrangement and runs the flexible tube through a pinch valve. The sealed end of the tube is then cut off, and dispensing of the milk is accomplished by control of the valve.

Unfortunately, it has been found that the foregoing does not result in the savings expected. This is due to a variety of factors. First, the stainless steel drums are, in and of themselves, quite costly. Secondly, there is added expense involved in deposits, and the clerical work attending records of deposits and returns. Thirdly, theft of the stainless steel drums runs high and adds greatly to the cost of this system. Lastly, of course, the stainless steel drums must be thoroughly sterilized, and it is found that this has become quite prohibitive in cost.

The utilization of a flexible bag formed of a synthetic material such as polyethylene, the vinyl materials, and the like, is well suited to overcome some of the foregoing objections. Thus, a polyethylene bag of approximately 3 to 4 mils in thickness can be cheaply manufactured and modified by welding near the bottom thereof, a nipple or spout serving the same purpose as explained above. The strength limitations and susceptibility to breakage by puncturing, etc., of the thin-walled bag makes it desirable to provide for a supporting and protective receptacle. The supporting aspect is quite important due to the fact that economy of space necessitates the bag being appreciably smaller in cross-sectional dimension than in height, thus involving an appreciable head of liquid.

To the present time, there has not been devised a receptacle for supporting the fluid-filled bag which is sufficiently economical and yet capable of providing satisfactory support for the liquid-filled bag and, at the same time, protecting the dispensing arrangement from external forces attendant with shipping and handling thereof.

Accordingly, it is an object of this invention to provide a receptacle construction which may be formed from an economical, relatively stiff, sheet-like material, which construction is such as to permit the safe reception and support of a flexible bag containing bulk liquid.

It is also an object of this invention to provide such a receptacle or container which is composed of two compartments, one of which is used to receive the bulk liquid in the flexible bag, and the other compartment permitting storing of auxiliary equipment used in dispensing the liquid at the retail outlet.

It is a further object of the present invention to provide a blank of the carton construction, which blank is composed of one piece of a relatively stiff, sheet-like material.

It is still another object of this invention to provide such a blank knock-down portion of a receptacle which is slitted and scored so as to be erectable into a receptacle construction capable of fulfilling the necessary requirements, and which is easily assembled into an operational structure.

It is still another object of the present invention to provide such a blank or knock-down form which utilizes a minimum of the material of construction.

These and other objects of this invention will become apparent to those skilled in the art from the following detailed description, taken in conjunction with the annexed sheets of drawings, on which there are presented for purposes of illustration only, several preferred embodiments of the invention.

In the drawings:

FIG. 1 is a plan view of the receptacle of this invention in knock-down blank form.

FIG. 2 is a side elevational view showing the receptacle of this invention at an intermediate stage of erection.

FIG. 3 is an elevational view in section with portions broken away of the carton construction of this invention in fully assembled form.

FIG. 4 is a perspective view taken looking upward at the bottom of the carton construction and showing a further stage in the assembly of the carton.

FIG. 5 is similar to FIG. 1, but showing a variation in the formation of a portion of the carton blank.

FIG. 6 is a plan view, viewed from above, showing the arrangement of the sides of the receptacle construction utilizing the blank illustrated in FIG. 5.

FIG. 7 is a three-quarter, prospective view with portions broken away, showing the carton in final assembled form.

Basically, the receptacle of this invention comprises a principal hollow tubular body having an even plurality of at least six sides, and including a pair of integral bottom wall elements, one of which is supportingly recessed from the other in order to yield a two-compartment receptacle, one of which is adapted to contain contents and dispensing arrangements isolated from the compartment for the flexible bag containing liquid.

Referring now more specifically to the drawings, there is shown in FIG. 1 a single piece blank 11 formed of corrugated board which may be formed into the two-compartment receptacle of the present invention. This blank consists of a principal central rectangular portion 12, bounded by opposed vertical side edges 13 and 14, and upper and lower edges 15 and 16 in parallel, spaced-apart relationship. This rectangular portion 12 is divided by score lines 17 which are parallel to the edges 13 and 14, and perpendicular to the edges 15 and 16, into a linear series of rectangular side panels 18, 19, 20, 21, 22, and 23, and an auxiliary glue flap 24, which is adapted to overlap the panel 18 to form a closed hollow tube defining a hexagon. From each end of the panel members 18, 20, 21 and 23, there are connected triangular flaps identified, respectively, as 18′, 18″, 20′, 20″, 21′, 21″, 23′ and 23″. These triangular flaps are separated from the panels by the edges 15 and 16 which are impressed score lines and lend foldability to the triangular flaps. At the upper edge 15 of panels 19 and 22, there are provided trapezoidal flap extension 19′ and 22′, respectively, which trapezoidal flaps have their minor base formed by the score line 15, respectively. The flaps extending foldably beyond the score line 15 are separated one from the other by slits 25. It will be appreciated that these upper flaps will overlap and completely close the top of the receptacle when the receptacle has been formed into tubular configuration. They may be then suitably sealed by the utilization of staples or glue or other closure means.

A trapezoidally shaped flap extends beyond the fold line 16 at the panel 19. The trapezoid has its minor base defined by the portion of the fold line 16 within the score lines 17 on either side of the panel 19. This trapezoidal flap 26 contains score lines 27 and 28, respectively, which divide the lower corners of the trapezoid into foldable flap extensions. One of these, designated 29, is a trapezoid, and the other, designated 30, is triangular. The score lines 27 are so positioned as to define a central portion of the flap 26, which is a six-sided polygon 31, conforming in configuration to the sectional configuration of the tubular member composed of the side panels identified above. To the major base of the trapezoidal flap member, there is foldably attached a closure flap member 32, having at each end wing flaps 33 and 34. Score lines 35 lend foldability of the flaps 33 and 34 with respect to the flap 32 and, in addition, the flaps 33 and 34 are separated from the main portion of the trapezoidal flap by slit 36. Numerals 37 and 38 identify slits which separate the triangular flaps 18″ and 20″ from the trapezoidal flap member 26.

Extending from side panel 22 is a polygonal flap member 41. The polygonal flap 41 is separated from panel 22 by a fold line 42 parallel to fold line 16, but spaced opposite to the direction of extension of flap 26. Slits 43 and 44 define two additional sides of the hexagonal flap 41 and serve to separate it from the remainder of the blank and, in particular, from side panel 21 and the depending triangular flap 21″, and the side panel 23 and the depending triangular flap 23″. Numerals 45, 46, and 47 identify the remaining sides of the hexagonal panel 41, and to each of these are foldably attached, respectively, flaps 50, 51, and 52. The hexagonal panel 41 is provided with an aperture 53 closely adjacent to the fold line 42 separating it from the panel 22. Side panels 21 and 23 on either side of panel 22 are provided with angular slits 54 and 55. These are positioned closely adjacent in the same plane as fold line 42, and serve a purpose as explained more fully hereinafter.

To erect the blank just described into the formation of a carton of this invention, the panel 41 is relatively folded about the fold line 42 to bring it into a plane normal to the panel 22. Then, the flaps 50, 51, and 52 are folded reversely into a downward position perpendicular to the panel 41. Next, the panel members 18—23 are relatively folded about the fold lines 17 to bring the glue flap 24 into overlapping relationship with respect to the panel 18, and with the panels suurounding the hexagonal panel 41. In this form, the side 43 of the panel 41 will be in abutting contact with panel 21, and in like fashion, sides 45, 46, 47, and 44 will be in abutting contact, respectively, with panels 20, 19, 18, and 23. As indicated hereinbefore, glue, staples, or other fastening means may be utilized to hold the glue flap 24 in firm, overlapping relationship with respect to the panel 18. In the construction as so far described, the flaps 50, 51, and 52 extending downwardly from the hexagonal panel member 41 will be in abutting contact, respectively, with the side panels 20, 19, and 18. In FIG. 3, there is shown, in particular, the flush relationship of flap 51 with respect to side panel 19. Next, the bottom triangular flaps 18″, 20″, 21″, and 23″ are folded upwardly into the plane defined by fold line 16.

The construction as thus far described is illustrated in FIG. 2, wherein, however, the relationship of the top triangular trapezoidal closure flaps has been eliminated for simplicity of illustration, it being recognized that this feature of closing is well-known and constitutes no part of the present invention. Finally, the corners of the trapezoidal flap 26 are folded upwardly about the score lines 27 and 28, and the trapezoidal panel 31 brought upwardly about the minor base of the trapezoid in a manner shown in FIG. 4. The corner flaps 30 will then be inserted into the angular slots 54 and 55, respectively, and this will bring the trapezoidal flap portions 29 into abutting contact with the respective portions of the side panels 21 and 23 lying beneath the angular slots 54 and 55. When the triangular extension flaps 30 are inserted into the referred to angular slots, they will lie in supporting flush relationship with an edge portion of the recessed polygonal panel 41, as best illustrated in FIG. 3.

In accordance with the present invention, there is produced from a one-piece blank of stiff, sheet-like material such as corrugated board, a tubular two-compartment container. These compartments have been designated A and B in FIG. 3. Compartment A is adapted to receive and maintain a polyethylene bag which may be filled with a bulk liquid such as milk. The bag of milk will rest on the inner or false bottom panel 41. Aperture 53, in the panel 41 separating compartment A from compartment B, provides a passageway for the nipple and hose arrangement attached to a fluid-containing bag as explained hereinbefore. Compartment B is used for storing the flexible hose 71 and as protection for the nipple 72 heat-sealed onto the bottom of the polyethylene bag (not shown). Panel 41, which constitutes the inner or false bottom, is novelly supported in spaced-apart relationship from the principal or outer bottom panel 31. Thus, the fold line 42, separating panel 22 from the inner bottom panel 41, adequately holds the panel 41 spaced from bottom 31. In addition, sides 43 and 44 of the false bottom 41 are supported by flap extensions 30 inserted through the angular slots 54, 55, in panels 21 and 23 adjoining panel 22. The remaining sides of the polygonal false bottom, namely 45, 46, and 47, are supported in spaced-apart relationship from the principal bottom member 31 by the foldable flaps 50, 51, and 52. Most preferably, the dimensions of the latter flaps are chosen to be slightly greater than the dimension between fold line 42 and fold line 16, the latter forming the bottom plane of the ultimate receptacle. In this fashion, the side of the false bottom 41 opposite the side containing the aperture 53, is elevated, whereupon the liquid in the polyethylene bag is urged by gravity in the direction of the aperture 53, insuring draining of the liquid therefrom most efficiently. This is illustrated in FIG. 3, wherein it may be seen that the false bottom 41 is not strictly in spaced-apart parallel relationship with the outer principal bottom member 31.

The recessed relationship of the fold line 42 for forming the false bottom member 41 leaves, when the receptacle is erected, a void or space 61 between side panels 21 and 23 and the bottom 31. This void is conveniently utilized as a means of access to the compartment B. This void 61 is conveniently closed by provision of flap 32 and associated wing flaps 33 and 34. The latter two are provided with rounded corners, thus permitting the flap 32 to be folded upwardly or downwardly when the wing flaps 33 and 34 are folded vertical thereto, and inserted into the sides 62 and 63 of the void 61.

A modified form of construction of the receptacle or container of this invention is shown in FIGS. 5 and 6, in which the same numerals or equivalent parts will be utilized, except where noted.

The modification to be described hereinafter was resorted to in order to avoid a problem which is sometimes experienced, particularly in connection with receptacles of this invention of the larger size, wherein the head of liquid involved causes a bowing out of the side panel members. With the side members bowed out ever so slightly, the milk or other liquid in the polyethylene bag has a tendency to creep down between the side wall panels and the supporting flaps holding the false bottom spaced from the principal outer bottom wall. As a consequence, any jostling or moving of the receptacle can frequently effect a rip, tear, or a zone of weakness in the polyethylene bag, whereupon ultimate failure and leakage are possible.

In FIG. 5, there is shown a portion of a blank 11a which is quite similar to the blank 11 shown in FIG. 1. This blank is divided by score lines 17a into a linear series of rectangular side panel members, of which there are six, but only four of which, 20a through 23a, are shown. A glue flap 24a serves the same purpose as the glue flap 24 described in connection with FIG. 1. The portion of the blank 11a which is not shown is in all other respects exactly the same as that shown in connection with FIG. 1. A number of triangular flaps 20a'', 21a'', and 23a'' extend axially from the bottom edges of panel members 20a, 21a, and 23a, and are separated therefrom by score and fold line 16a. The side panel 22a contains a fold line 42a spaced upwardly from the fold line 16a, and also serves as the point of attachment of a polygonal panel 41a. It will be recalled in connection with the blank 11 discussed in FIG. 1, that the polygonal bottom wall 41 was formed to have six sides, of which the fold line 42 joining the panel 22 thereto constituted one side. The blank in the present modification likewise has fold line 42a serving as one side of the polygon. However, instead of having five additional sides (43, 44, 45, 46, 47 of FIG. 1), the polygonal bottom 41a of the present modification has ten sides, 43a, 43b, 44a, 44b, 45a, 45b, 46a, 46b, 47a, 47b, in addition to the side defined by fold line 42a. Flap 50a extends outwardly from the two adjacent sides 45a and 45b. In a similar fashion, flap 51a extends outwardly from sides 46a and 46b, and flap 52a extends outwardly from sides 47a and 47b. These flaps are foldable with respect to the polygonal panel 41a and contain a score or fold line 81 normal to the intersection of the corresponding sides of the polygonal member.

The side panels 21a and 23a are provided, respectively, with angular slots 54a and 55a, while the panel 41a is provided with an aperture 53a adjacent to the fold line 42a.

A carton or receptacle to be reproduced from a blank incorporating the modification as just described is erected into operative form in the same manner as that described hereinbefore, although it will prove helpful if the folds in the bottom panel 41a and its associated flaps are given a preliminary folding so that they will be more easily formed into the final construction. The effect achieved by the utilization of the embodiment just described is illustrated in FIG. 6. It should be noted, however, that for simplicity of illustration, FIG. 6 is slightly distorted with respect to the degree of bowing out of the sides. At any rate, it can be seen that the corner of the intersection of side 46b, 46c strikes the midpoint of side panel 19a, bowing it slightly outwardly when the panel members, as, for instance, 19a, are wrapped about the panel member 41a. This gives a pre-stress to the normally straight side 19a, and the natural elasticity of the side panel 19a attempts to keep it tightly pressed against the sides 46b and 46c. The same phenomena is experienced with respect to the side panel members 20a, 21a, 23a, and 18a, in connection with the opposed sides of the polygonal panel member 41a. The end result is that the chances of a gap or opening occurring between the sides of the polygonal bottom member and the sides of the tubular member is reduced materially, so that the liquid-filled bag does not tend to slip down in between the sides of the false bottom and the major tube, and become pinched therebetween, as described hereinbefore.

It has been found that the receptacle or container of this invention should consist of at least six sides, and thus define in section, a hexagon. Furthermore, the carton may consist of more sides so long as they are an even number. The foregoing is true, however, only with respect to accomplishing the feature discussed hereinbefore, namely, having the aperture in the false bottom at a point lower than the remaining portion of the false bottom, thereby achieving complete draining of the receptacle.

It is found that the blank used in forming the carton or receptacle of this invention should desirably be coated on the surface ultimately becoming the interior of the final receptacle with a wax coating. This wax coating resists penetration by any moisture which might be present due to condensation of moisture in the atmosphere on the cold outer surface of the polyethylene bag containing a liquid such as milk at a temperature below that of the prevailing atmospheric conditions. In accordance with the foregoing, it can be appreciated that the complete draining feature afforded by the construction according to this invention can be achieved only where an even number of side panels are provided for, whereby the recessed panel or false bottom can be foldably attached to a side panel which will be opposite from the side panel to which is foldably attached the principal outer body member. Utilizing an odd number of side panels, oppositeness in this respect is impossible.

Receptacles or containers manufactured according to the foregoing teachings have been found to be ably suited to accomplishing the purposes intended under actual service conditions, wherein the receptacles containing a polyethylene bag and a quantity of milk therein were handled and subjected to alternate cooling and room temperature conditions without failure of the receptacle walls. It was further found that the false bottom or recessed inner bottom wall was adequately supported by the flap provisions outlined hereinbefore, so that no cave-in of the false bottom was experienced, even under rigorous service conditions.

Although the receptacle or container according to this invention has been described in conjunction with a polyethylene bag containing milk, it will be appreciated that the construction features disclosed herein will find wide application and, in particular, that other plastic film-like materials may be utilized and, as well, other fluid or pulverulent materials may be conveniently packaged utilizing the structural features disclosed herein. It is to be noted that materials of construction other than the corrugated board referred to herein may be used in accordance with the present invention.

Furthermore, inasmuch as many other apparently widely different embodiments of this invention may be made without departing from the spirit and scope thereof, it is to be understood that the invention is not limited to the specific embodiments illustrated or explained herein, except as defined in the appended claims.

I claim:

1. A two-compartment paper container comprising a tubular member having at least four foldably connected side wall panels defining a substantially uniform polygon in section; an outer bottom wall foldably attached to one end edge of a first side wall panel and defining a central polygonal panel conforming to the contour of the tubular member, flap extensions foldably attached to said outer bottom wall, said flap extensions having end tabs foldably attached thereto, the outer bottom wall being folded normal to the axis of the tubular member thereby enclosing the bottom end of the tubular member, and said flap extensions being folded upwardly to lie in abutting relationship with the side wall panels; an inner bottom wall foldably connected to a second side wall panel located opposite the first side wall panel with the connection being spaced upwardly from the outer bottom wall, and said inner bottom wall being folded to lie in spaced relationship above said outer bottom wall thereby defining a major compartment above said inner bottom wall and a minor compartment below said inner bottom wall; slots on the side wall panels adjacent to said second side wall panel, said slots being located beneath the inner bottom wall, and said end tabs being folded to extend into the slots to closely underlie said inner bottom wall, thereby locking the outer bottom wall in place and supporting the inner bottom wall.

2. The container as claimed in claim 1, wherein the inner bottom wall defines a polygon having a greater number of sides and a greater area than that of a cross-section of the tubular body member, whereby the side wall panels of the tubular member are bowed slightly outwardly when the inner bottom wall is in place.

3. The container as defined in claim 1, plus at least one support flap foldably attached to a free edge of said inner bottom wall, said support flap being downwardly folded and adapted to rest on said outer bottom panel.

4. A two-compartment paper container comprising a tubular member having at least four foldably connected side wall panels defining a substantially uniform polygon in section; an outer bottom wall foldably attached to one end edge of a first side wall panel and defining a central polygonal panel conforming to the contour of the tubular member, flap extensions foldably attached to the outer bottom wall, said flap extensions having end taps foldably attached thereto, said outer bottom wall being folded normal to the axis of the tubular member thereby enclosing the bottom end of the tubular member, and said flap extensions being folded upwardly to lie in abutting relationship with the side wall panels; an inner bottom wall foldably connected to a second side wall panel located opposite the first side wall panel with the connection being spaced upwardly from the outer bottom wall, and said inner bottom wall being folded to lie in spaced relationship above said outer bottom wall thereby defining a major compartment above said inner bottom wall and a minor compartment below said inner bottom wall, and an opening in said minor compartment; slots on the side wall panels adjacent to said second side wall panel, said slots being located beneath the inner bottom wall, and said end tabs being folded to extend into the slots to closely underlie said inner bottom wall, thereby locking the outer bottom wall in place and supporting the inner bottom wall; and a door flap foldably attached to said outer bottom wall for closing said minor compartment, said door flap being movable relative to the container when said outer bottom wall is locked in place.

References Cited in the file of this patent

UNITED STATES PATENTS

| | | |
|---|---|---|
| 1,039,026 | Carter | Sept. 17, 1912 |
| 1,996,997 | Inman | Apr. 9, 1935 |
| 2,020,353 | Brown | Nov. 12, 1935 |
| 2,078,038 | Staphens | Apr. 20, 1937 |
| 2,188,732 | Vogt | Jan. 30, 1940 |
| 2,726,803 | Ketler | Dec. 13, 1955 |